United States Patent
Nakamura et al.

(10) Patent No.: US 8,469,169 B2
(45) Date of Patent: Jun. 25, 2013

(54) MULTIPLE DISC CLUTCH AND ASSEMBLING METHOD THEREFOR

(75) Inventors: Kenichiro Nakamura, Saitama (JP); Satoru Nojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 362 days.

(21) Appl. No.: 12/880,221

(22) Filed: Sep. 13, 2010

(65) Prior Publication Data

US 2011/0061985 A1 Mar. 17, 2011

(30) Foreign Application Priority Data

Sep. 16, 2009 (JP) ................. 2009-215041

(51) Int. Cl.
*F16D 13/54* (2006.01)
(52) U.S. Cl.
USPC .......................... 192/54.5; 192/70.23; 29/428
(58) Field of Classification Search
USPC ..................................................... 192/70.23
See application file for complete search history.

(56) References Cited

U.S. PATENT DOCUMENTS

| | | | | |
|---|---|---|---|---|
| 7,311,183 B2* | 12/2007 | Black et al. | ............... | 192/110 R |
| 8,162,119 B2* | 4/2012 | Matsuda | ..................... | 192/70.23 |
| 2004/0040801 A1* | 3/2004 | Yamamoto et al. | .......... | 188/71.5 |
| 2009/0078526 A1 | 3/2009 | Kawatsu et al. | | |
| 2009/0277727 A1* | 11/2009 | Ueno | ........................... | 188/71.5 |

FOREIGN PATENT DOCUMENTS

| | | |
|---|---|---|
| JP | 2009-79706 A | 4/2009 |
| WO | WO 2007/119577 A1 * | 10/2007 |

* cited by examiner

*Primary Examiner* — Rodney Bonck
(74) *Attorney, Agent, or Firm* — Birch, Stewart, Kolasch & Birch, LLP (57) ABSTRACT

To provide a multiple disc clutch in which the engagement/disengagement timing of the clutch can be adjusted to a fixed value, and an assembling method for the multiple disc clutch. Two kinds of clutch discs different at least in thickness are combined, and the clutch disc or discs are replaced with the clutch disc or discs of other thickness so that the total thickness of a required number of the combined clutch discs when a predetermined pressure is applied thereto will be equal to a predetermined size, whereby the total thickness is adjusted.

18 Claims, 9 Drawing Sheets

MULTIPLE DISC CLUTCH AND ASSEMBLING METHOD THEREFOR

CROSS-REFERENCE TO RELATED APPLICATIONS

This application claims priority under 35 U.S.C. §119(a) to Application No. 2009-215041, filed in Japan on Sep. 16, 2009, the entirety of which is expressly incorporated herein by reference.

BACKGROUND OF THE INVENTION

1. Field of the Invention

The present invention relates to a multiple disc clutch preferable for use in an internal combustion engine of a motorcycle or the like. The present invention also relates to an assembling method for the multiple disc clutch.

2. Description of Background Art

As an internal combustion engine for a motorcycle, one which includes a multiple disc clutch engaged and disengaged to control the transmission of power between a crankshaft and a transmission has been known (refer to, for example, Japanese Patent Laid-Open No. 2009-79706). In the multiple disc clutch described in Japanese Patent Laid-Open No. 2009-79706, the pressure (referred to also as "pressing force") associated with the engagement and disengagement of the clutch is varied by a cam mechanism provided inside the clutch.

However, since a plurality of clutch discs are incorporated in a multiple disc clutch, the clutch engagement/disengagement timing differs from product to product due to the accumulation of dimensional errors of the individual clutch discs. Particularly, in the case of a multiple disc clutch in which the clutch pressing force is varied by a cam mechanism provided inside the clutch, it has been difficult to adjust the engagement/disengagement timing.

SUMMARY OF THE INVENTION

The present invention has been made in consideration of the above-mentioned circumstances. Accordingly, it is an object of the present invention to provide a multiple disc clutch in which the clutch engagement/disengagement timing can be adjusted to a constant value. It is also an object of the present invention to provide an assembling method for the multiple disc clutch.

In order to attain the above object, according to the present invention, there is provided a multiple disc clutch including a clutch outer to which a rotating force of a crankshaft is transmitted, a clutch center provided on an inner side of the clutch outer and rotated integrally with an output shaft, a plurality of clutch discs integrally rotatably held respectively on the clutch outer and the clutch center, and a pressure plate operable to press or release each of the clutch discs, wherein two kinds of clutch discs different at least in thickness are combined, and the total thickness of a required number of the clutch discs in a combined state is adjusted to a predetermined size.

According to this configuration, two kinds of clutch discs different at least in thickness are combined, and the total thickness of a required number of the clutch discs in a combined state is adjusted to a predetermined size. Therefore, the dimensional error of the clutch as a whole can be reduced, and the clutch engagement/disengagement timing can be adjusted to a constant value.

In the above-mentioned configuration, the multiple disc clutch may further include a cam mechanism which is provided between the clutch center and the pressure plate and which moves the pressure plate in a clutch axis direction so as to augment or lessen a pressure applied from the pressure plate onto the clutch disc when a relative difference in rotation is generated between the clutch center and the pressure plate. This configuration makes it possible to make the position where the clutch pressing force is adjusted by the cam mechanism accurate.

In addition, in the above-mentioned configuration, of the clutch discs rotated integrally with the output shaft, a plurality of the clutch discs and another plurality of the clutch discs may be divisionally attached respectively to the clutch center and the pressure plate, and, of the clutches, the clutches having substantially the same thickness may be integrally assembled onto the clutch center and the pressure plate. According to this configuration, since the clutch discs are assembled onto each of the clutch center and the pressure plate, the assembling work would not be troublesome.

Besides, in the above-mentioned configuration, the thickness of the clutch disc at an outermost end portion on either one side of the clutch discs set in the multiple disc clutch may be set to be different from the thickness of the adjacent clutch disc. According to this configuration, for further adjusting the total thickness of the clutch discs, it suffices to only change the thickness of the clutch disc at the outermost end portion, so that the range of adjustment is widened, and the clutch disc replacing work can be carried out efficiently.

Furthermore, according to the present invention, there is provided a method of assembling a multiple disc clutch including a clutch outer to which a rotating force of a crankshaft is transmitted, a clutch center provided on an inner side of the clutch outer and rotated integrally with an output shaft, a plurality of clutch discs integrally rotatably held respectively on the clutch outer and the clutch center, and a pressure plate operable to press or release each of the clutch discs, wherein two kinds of clutch discs different at least in thickness are combined, and the clutch disc or discs are replaced with a clutch disc or discs of other thickness, so that the total thickness of a required number of the combined clutch discs, when a predetermined pressure is applied thereto, will be equal to a predetermined size, whereby the total thickness is adjusted to the predetermined size. According to this configuration, the dimensional error of the clutch disks as a whole can be reduced, and the clutch engagement/disengagement timing can be adjusted to a fixed value.

In the present invention, two kinds of clutch discs different at least in thickness are combined, and the total thickness of a required number of discs in a combined state is adjusted to a predetermined size. This makes it possible to reduce the dimensional error of the clutch discs as a whole, and to adjust the clutch engagement/disengagement timing to a fixed value.

In addition, where the multiple disc clutch is provided with a cam mechanism which is disposed between the clutch center and the pressure plate and which moves the pressure plate in a clutch axis direction so as to augment or lessen a pressure applied from the pressure plate onto the clutch discs when a relative difference in rotation is generated between the clutch center and the pressure plate, it is possible to make the position where the clutch pressing force is adjusted by the cam mechanism accurate.

Besides, where the clutch discs rotated integrally with the output shaft are divisionally attached respectively to the clutch center and the pressure plate, and where, of the clutches, the clutches having substantially the same thickness may be integrally assembled onto the clutch center and the pressure plate, and the clutch discs are assembled onto each of the clutch center and the pressure plate, so that the assembling work would not be troublesome.

In addition, where the thickness of the clutch disc at an outermost end portion on either one side of the clutch discs set in the multiple disc clutch is set, the total thickness of the clutch discs can be further adjusted by only changing the thickness of the clutch disc at the outermost end portion, so that the range of adjustment can be widened, and the clutch disc replacing work can be carried out efficiently.

Furthermore, since two kinds of clutch discs different at least in thickness are combined, and the clutch disc or discs are replaced with a clutch disc or discs of other thickness, so that the total thickness of a required number of the combined clutch discs, when a predetermined pressure is applied thereto, is equal to a predetermined size, whereby the total thickness is adjusted to the predetermined size, it is possible to reduce the dimensional error of the clutch discs as a whole, and to adjust the clutch engagement/disengagement timing to a fixed value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
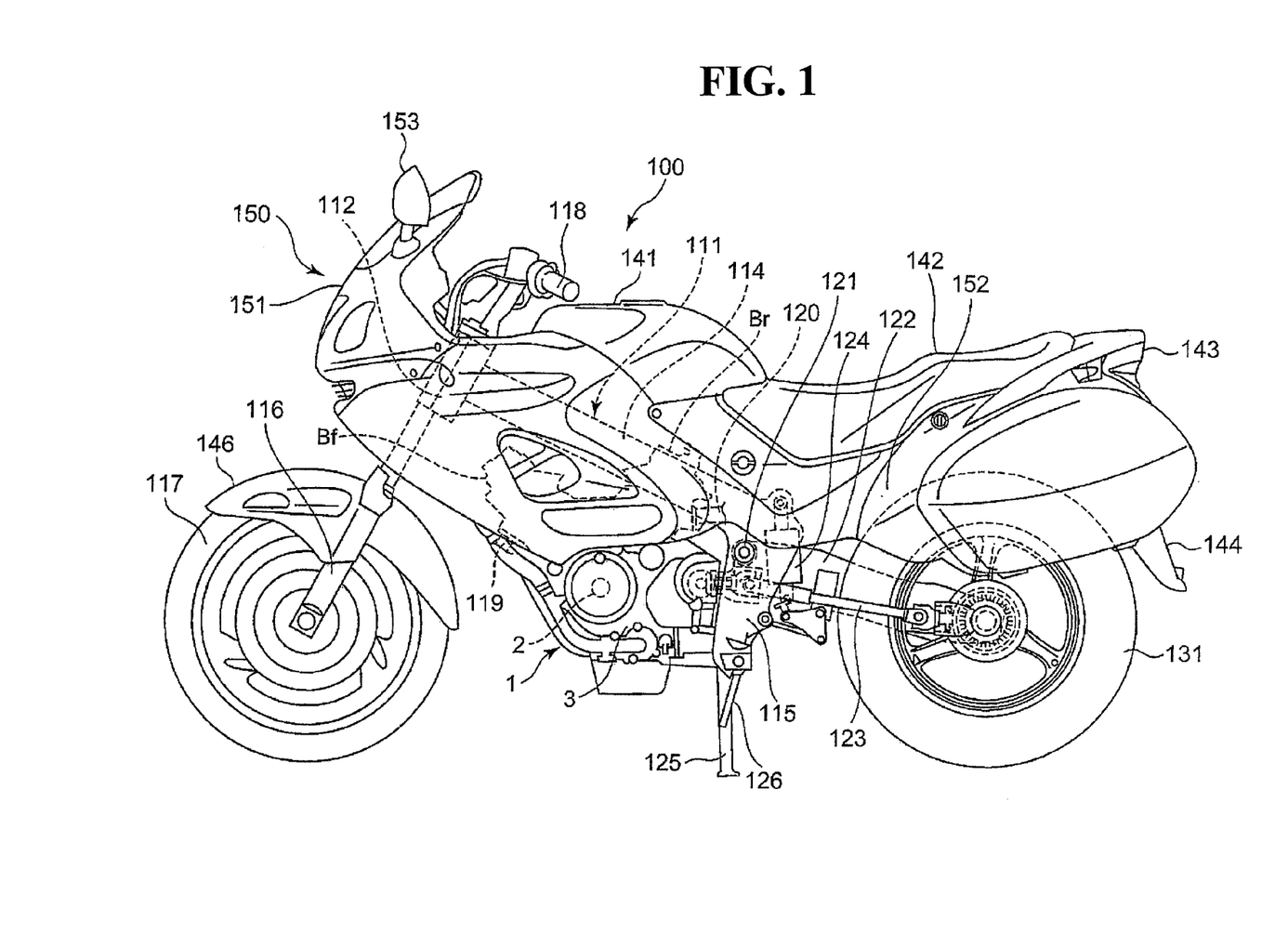
FIG. 1 is a side view of a motorcycle on which a multiple disc clutch according to an embodiment of the present invention is mounted.

The present invention will now be described with reference to the accompanying drawings, wherein the same reference numerals have been used to identify the same or similar elements throughout the several views. FIG. 1 is a side view of a motorcycle on which a multiple disc clutch according to an embodiment of the present invention is mounted. Incidentally, in the following description, the sides (or directions) such as front, rear, left, right, up and down are those with respect to the vehicle body.

A body frame 111 of a motorcycle 100 includes a head pipe 112 located at a front portion of the vehicle body, a pair of left and right main frames 114 extending rearward from the head pipe 112 to the center of the vehicle body, a pair of left and right pivot plates 115 extending downward from rear end portions of the main frames 114, and a rear frame (not shown) extending from rear end portions of the main frames 114 to a rear portion of the vehicle.

A front fork 116 is rotatably mounted to the head pipe 112, and a front wheel 117 is rotatably mounted to the lower ends of the front fork 116. In addition, a steering handle 118 is mounted to an upper portion of the head pipe 112.

A front-rear V-type 4-cylinder internal combustion engine (referred to also as "engine" or "power unit") 1 is disposed on the lower side of the main frames 114. The internal combustion engine 1 is of a transverse type having a crankshaft 2 oriented in the left-right horizontal direction, is of an OHC type, and is of a water-cooled type. The internal combustion engine 1 is a narrow-angle V-type engine; specifically, it has a crankcase 3, from which a front bank (cylinders) Bf having two cylinders inclined toward the front side and a rear bank (cylinders) Br having two cylinders inclined toward the rear side are extended in a V-shape, and a bank angle formed between the front and rear banks is smaller than 90 degrees.

One-side ends of a pair of left and right exhaust pipes 119 are connected to exhaust ports of the front bank Br, are extended downward from the exhaust ports, are then laid around toward the rear side of the vehicle body, and are collectively connected to a pair of left and right exhaust pipes 120 extended from exhaust ports of the rear bank Br. The resulting collected pipe is connected through a single exhaust pipe (not shown) to a muffler (not shown) provided on the rear side of the internal combustion engine 1.

A pivot shaft 121 is provided on the rear side of the internal combustion engine 1, and a rear fork 122 is mounted to the pivot shaft 121 so as to be vertically swingable about the pivot shaft 121. A rear wheel 131 is rotatably supported on rear end portions of the rear fork 122. The rear wheel 131 and the internal combustion engine 1 are coupled to each other through a drive shaft 123 provided inside the rear fork 122. A rotational drive force is transmitted from the internal combustion engine 1 to the rear wheel 131 through the drive shaft 123. In addition, a rear cushion 124 for absorbing shock transmitted from the rear fork 122 is bridged between the rear fork 122 and the body frame 111.

A stand 125 for resting of the vehicle body is provided at a rear portion of the internal combustion engine 1. Besides, a side stand 126 is provided at a lower portion of a left side surface of the internal combustion engine 1.

A fuel tank 141 is mounted on upper portions of the main frames 114 in such a manner as to cover the upper side of the internal combustion engine 1. A seat 142 is located on the rear side of the fuel tank 141, and the seat 142 is supported on the rear frame. A tail lamp 143 is disposed on the rear side of the seat 142, and a rear fender 144 for covering the upper side of the rear wheel 131 is disposed on the lower side of the tail lamp 143.

In addition, the motorcycle 100 has a resin-made body cover 150 for covering the vehicle body. The body cover 150 includes a front cover 151 for continuously covering a portion ranging from the front side of the body frame 111 to a front portion of the internal combustion engine 1, and a rear cover 152 for covering the lower side of the seat 142. A pair of left and right mirrors 153 is attached to upper portions of the front cover 151. Besides, a front fender 146 for covering the upper side of the front wheel 117 is mounted to the front fork 116.

Figure 2:
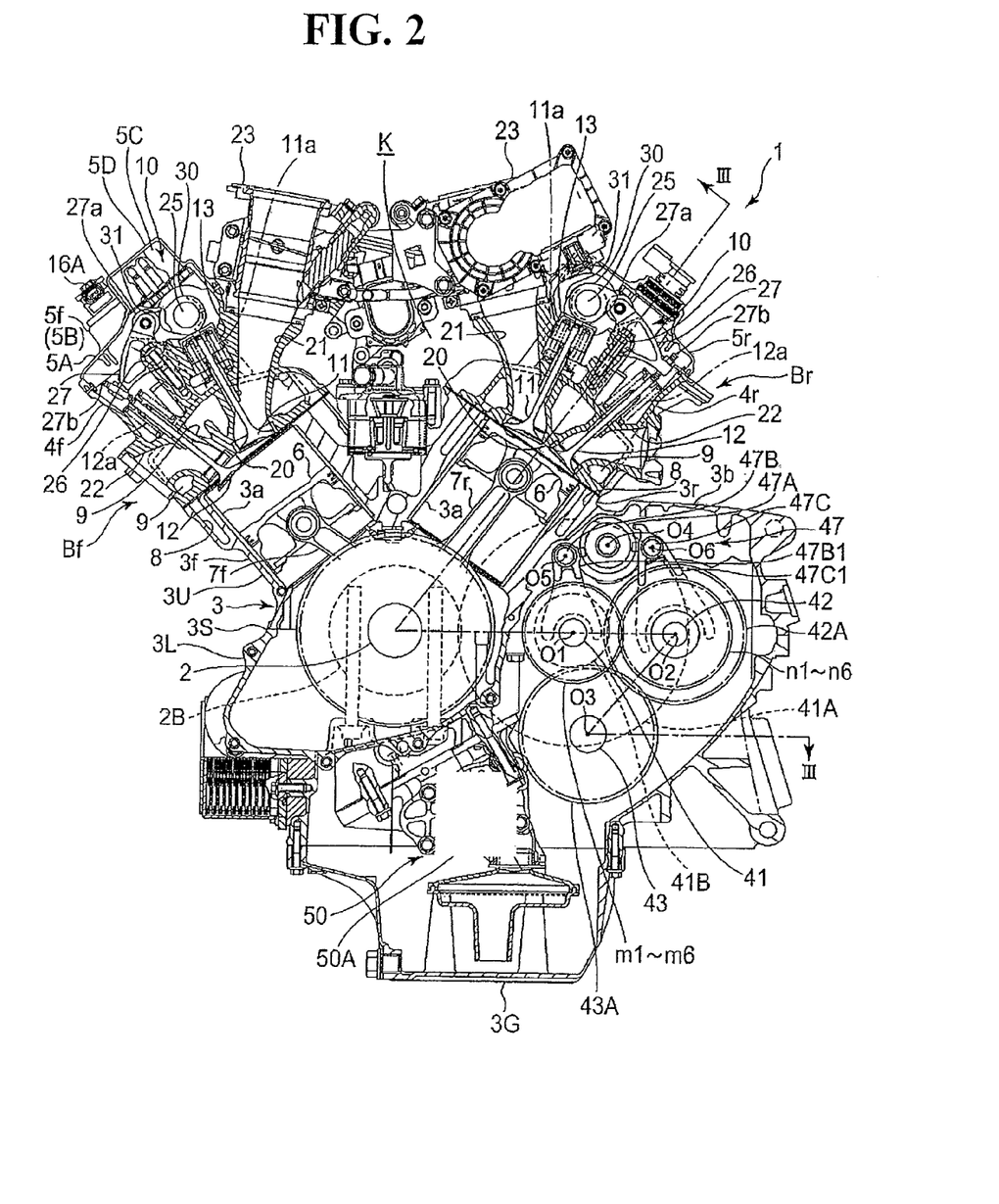
FIG. 2 is a sectional view of an internal combustion engine.

FIG. 2 is a sectional view of the internal combustion engine 1. Incidentally, the description referring to FIG. 2 will be made while taking the upper and lower sides in the drawing as the upper and lower sides of the internal combustion engine 1, taking the left side in the drawing as the front side of the internal combustion engine 1, and taking the right side in the drawing as the rear side of the internal combustion engine.

Between the front bank Bf and the rear bank Br, there is formed a V-bank space K as a space which is V-shaped in side view.

The crankcase 3 is configured to be splittable into upper and lower parts, and, hence, has an upper crankcase (upper case member) 3U and a lower crankcase (lower case member) 3L. The crankshaft 2 is rotatably clamped between the crankcases 3U and 3L. The upper crankcase 3U has a front cylinder block 3f and a rear cylinder block 3r, in each of which two cylinders are arranged on the left and right sides. The front cylinder block 3f and the rear cylinder block 3r are integrally formed while extending upward in a skewed manner, so as to form a V shape in side view.

The lower crankcase 3L is provided at its lower portion with an oil pan 3G for reserving an oil (lubricating oil) for the internal combustion engine 1, in such a manner as to bulge to the lower side. An oil pump 50 for circulating the oil inside the internal combustion engine 1 is located on the lower side of the crankshaft 2 inside the lower crankcase 3L.

A front cylinder head 4f is fastened to the front cylinder block 3f by fastening bolts (not shown) and is stacked on a front upper side of the front cylinder block 3f. The upper side of the front cylinder head 4f is covered by a front cylinder head cover 5f. Similarly, a rear cylinder head 4r is fastened to the rear cylinder block 3r by fastening bolts (not shown) and is stacked on a rear upper side of the rear cylinder block 3r. The upper side of the rear cylinder head 4r is covered by a rear cylinder head cover 5r.

The front cylinder block 3f and the rear cylinder block 3r are each provided with cylinder bores 3a. Pistons 6 reciprocated in the cylinder bores 3a are disposed in the cylinder bores 3a. Each of the pistons 6 is connected to the single crankshaft 2 (which is provided in common to all the pistons 6) through each of connecting rods 7f, 7r.

In addition, water jackets 8 permitting cooling water for cooling the cylinder blocks 3f, 3r to flow therethrough are provided respectively in the cylinder blocks 3f, 3r so as to surround the cylinder bores 3a.

The front cylinder heads 4f and the rear cylinder heads 4r are provided with combustion chambers 20 (which is located on the upper side in the cylinder bores 3a), intake ports 21 and exhaust ports 22. A throttle body 23 for adjusting the quantity of a fuel-air mixture flowing in each of the intake ports 21 is connected to each of the intake ports 21.

In addition, water jackets 9 permitting cooling water for cooling the cylinder heads 4f, 4r to flow therethrough are provided respectively in the cylinder heads 4f, 4r so as to surround the intake ports 21 and the exhaust ports 22.

Besides, in each of the cylinder heads 4f, 4r, a pair of intake valves 11 are openably and closably arranged in the state of being biased by valve springs 11a in directions (valve-closing directions) for closing the intake ports 21, and a pair of exhaust valves 12 are openably and closably arranged in the state of being biased by valve springs 12a in directions for closing the exhaust ports 22.

The intake valves 11 and the exhaust valves 12 are driven to open and close by uni-cam type valve gears 10 in which the valves are driven by camshafts 25 arranged one for each of the cylinder heads 4f, 4r.

The valve gears 10 each include the camshaft 25 rotatably supported in the cylinder head 4f, 4r on the upper side of the intake valve 11, a rocker shaft 26 fixed to the cylinder head 4f, 4r with its axis set parallel to the camshaft 25, and a rocker arm 27 rockably supported on the rocker shaft 26.

The camshaft 25 has an intake cam 30 and an exhaust cam 31 projected to the outer circumference side of the camshaft 25, and is rotated synchronously with the rotation of the crankshaft 2. The intake cam 30 and the exhaust cam 31 each have a cam profile in which the distance (radius) from the center to the outer circumference is not constant. The intake valve 11 and the exhaust valve 12 are moved up and down by variations in radius attendant on the rotation of the intake cam 30 and the exhaust cam 31.

In addition, a valve lifter 13 slidably fitted to each of the cylinder heads 4f, 4r on the lower side of the camshaft 25 is provided between the camshaft 25 and the intake valve 11.

A roller 27a making rolling contact with the exhaust cam 31 is provided at one end of the rocker arm 27, rotatably supported by the rocker shaft 26. A tappet screw 27b abutting on the upper end of the exhaust valve 12 is screw engaged with the other end of the rocker arm 27 so that the advanced/retracted position thereof can be adjusted.

When the intake cam 30 and the exhaust cam 31 are rotated integrally with the camshaft 25, the intake cam 30 pushes the intake valve 11 downward through the valve lifter 13, and the exhaust cam 31 pushes the exhaust valve 12 downward through the rocker arm 27, whereby the intake port 21 and the exhaust port 22 are opened and closed at predetermined timings which are determined by the rotational phases of the intake cam 30 and the exhaust cam 31.

Figure 3:
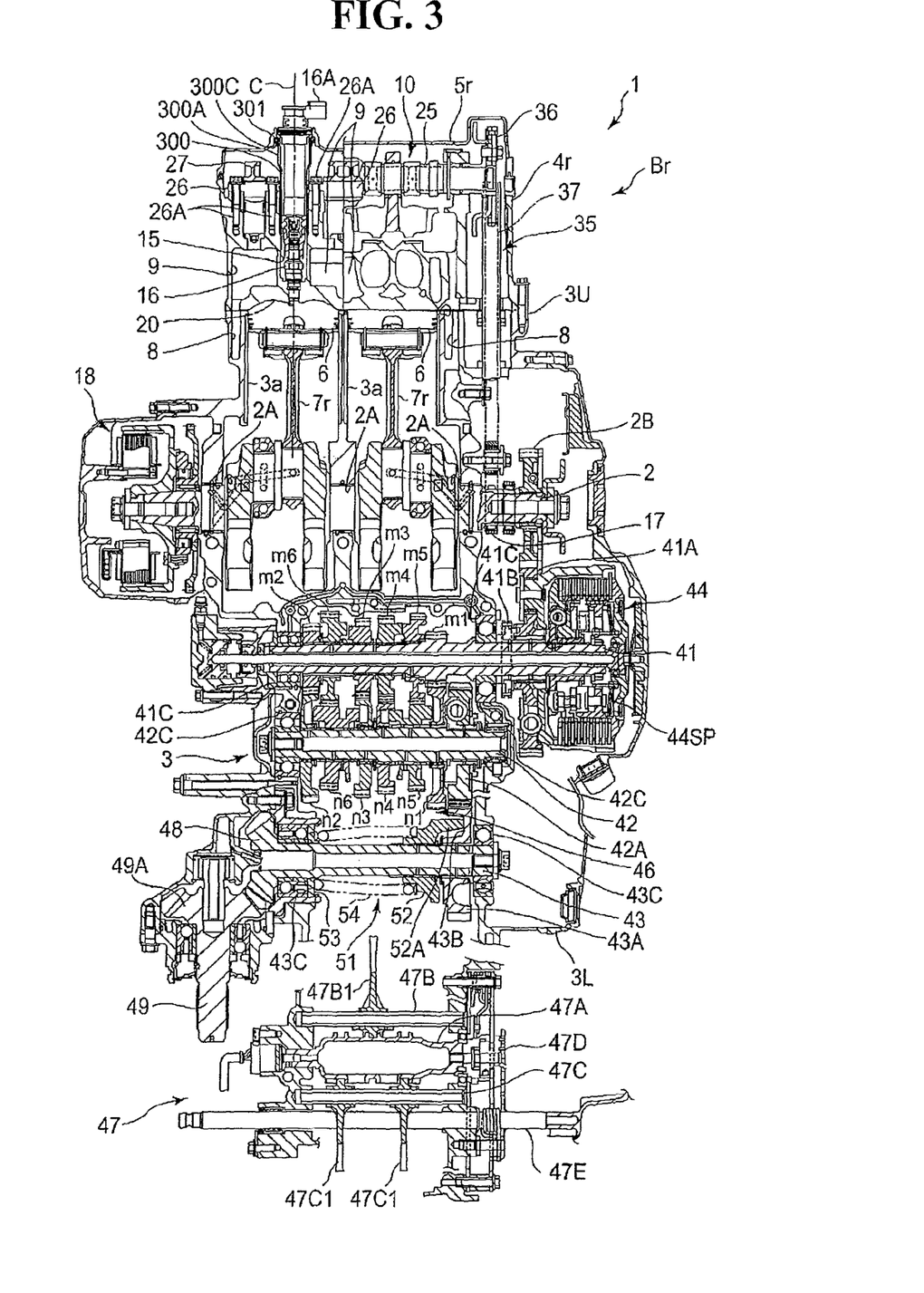
FIG. 3 is a sectional view taken along line of FIG. 2.

FIG. 3 is a sectional view taken along line of FIG. 2. While a section of the rear bank Br is shown in FIG. 3, the inside of the front bank Bf is configured in the same manner as the inside of the rear bank Br, and, therefore, description of the front bank Bf will be omitted.

As shown in FIG. 3, each of the cylinders in the cylinder heads 4r is provided with a plug insertion hole 15 on a cylinder axis C, which is the center axis of the cylinder bore 3a. A spark plug 16 (a spark plug for the cylinder on the right side is not shown) is disposed in the plug insertion hole 15, with its tip fronting on the inside of the combustion chamber 20.

The crankshaft 2 is rotatably supported inside the crankcase 3 through metal bearings 2A which are provided at both end portions and a central portion in the axial direction thereof.

A camshaft drive sprocket 17 for outputting the rotation of the crankshaft 2 is provided on one end side of the crankshaft 2. A cam chain chamber 35 extending vertically inside each of the banks Bf and Br is provided on the side of the camshaft drive sprocket 17 in the internal combustion engine 1. A driven sprocket 36 rotated as one body with the camshaft 25 is located inside the cam chain chamber 35, and is fixed to one end of the camshaft 25. A cam chain 37 is wrapped around the driven sprocket 36 and the camshaft drive sprocket 17, and the camshaft 25 is rotated at a rotating speed of one half that of the crankshaft 2, through the functions of the cam chain 37 and the driven sprocket 36.

In addition, a generator 18 is provided at the other end portion of the crankshaft 2.

A main shaft 41, a counter shaft 42, and an output shaft 43 are disposed inside the crankcase 3 in parallel to the crankshaft 2. These shafts 41, 42, 43 inclusive of the crankshaft 2 constitute a gear transmission mechanism for transmitting the rotation of the crankshaft 2 in the sequence of the main shaft 41, the counter shaft 42, and the output shaft 43.

As shown in FIG. 2, the crankshaft 2 is disposed on a mating surface 3S between the upper crankcase 3U and the lower crankcase 3L. The main shaft 41 is disposed on the rear side of the crankshaft 2, and the counter shaft 42 is disposed on the rear side of the main shaft 41. The main shaft 41 and the counter shaft 42 are disposed on the mating surface 3S. In addition, the output shaft 43 is disposed on the front and lower side of the counter shaft 42. Thus, the axis centers O1 and O2 of the main shaft 41 and the counter shaft 42 are located at front and rear positions on the mating surface 3S, whereas the axis center O3 of the output shaft 43 is located on the rear side of the axis center O1 of the main shaft 41 and on the front and lower side of the axis center O2 of the counter shaft 42.

FIG. 3 is a sectional view along a section which interconnects the rear bank Br, the crankshaft 2, the main shaft 41, the counter shaft 42, and the output shafts 43 by straight lines.

A crank-side drive gear 2B for rotating the main shaft 41 is fixed to an end on the cam chain chamber 35 side of the crankshaft 2. The crank-side drive gear 2B is in mesh with a main shaft-side driven gear 41A on the main shaft 41. The main shaft 41 is supported through bearings 41C provided at both ends thereof.

The main shaft-side driven gear 41A is provided on the main shaft 41 so as to be rotatable relative to the main shaft 41, and is connected to a clutch mechanism 44. By the operations of the clutch mechanism 44, the transmission of power between the crankshaft 2 and the main shaft 41 can be effected and can be interrupted.

In addition, the main shaft-side driven gear 41A is provided with an oil pump drive gear 41B for driving an oil pump 50 (see FIG. 2). The oil pump drive gear 41B is rotated as one body with the main shaft-side driven gear 41A, independently of the engagement/disengagement of the clutch mechanism 44. As shown in FIG. 2, the oil pump drive gear 41B transmits the rotation of the crankshaft 2 to a driven gear fixed to a drive shaft 50A of the oil pump 50 by way of a drive chain, thereby driving the oil pump 50.

As shown in FIG. 3, the counter shaft 42 is supported by bearings 42C provided at both ends thereof. A group of speed change gears are provided between the counter shaft 42 and the main shaft 41, to constitute a transmission 46. More in detail, drive gears m1 to m6 for six speeds are provided on the main shaft 41, and driven gears n1 to n6 for six speeds are provided on the counter shaft 42. The drive gears m1 to m6 and the driven gears n1 to n6 are meshed with each other on the basis of each gear speed, to constitute speed change gear pairs (combinations of gears) corresponding to the gear speeds, respectively. Incidentally, the speed change gear pairs decrease in reduction gear ratio (increase in gear speed) in the order of the first speed to the sixth speed. The first-speed gear pair m1, n1 having a greatest reduction gear ratio is disposed on one end side of the main shaft 41 on which the main shaft-side driven gear 41A is supported, and the second-speed gear pair m2, n2 is disposed on the other end side. Fifth-speed gear pair m5, n5, fourth-speed gear pair m4, n4, third-speed gear pair m3, n3 and sixth-speed gear pair m6, n6 are arranged between the first-speed gear pair m1, n1 and the second-speed gear pair m2, n2, in this order from the one end side.

The third-speed drive gear m3 and the fourth-speed drive gear m4 on the main shaft 41 are integrally spline-connected to the main shaft 41, and can be selectively engaged with and disengaged from the adjacent fifth-speed drive gear m5 or sixth-speed drive gear m6, by moving in the axial direction as shifter. The fifth-speed driven gear n5 and the sixth-speed driven gear n6 on the counter shaft 42 are individually spline-connected to the counter shaft 42, and can be engaged with and disengaged from the adjacent fourth-speed driven gear n4 or the third-speed driven gear n3, by moving in the axial direction as shifter.

The third-speed drive gear m3 and the fourth-speed drive gear m4 provided on the main shaft 41 so as to serve as shifter and the fifth-speed driven gear n5 and the sixth-speed driven gear n6 provided on the counter shaft 42 so as to serve as shifter are moved by a gear shift mechanism 47 (see FIG. 2), whereby a gear shift is carried out.

As shown in FIG. 2, the gear shift mechanism 47 has a shift drum 47A parallel to the shafts 41 to 43. The shift drum 47A is coupled to a shift spindle (also called a shift shaft) 47E (see FIG. 3) through a ratchet mechanism 47D (see FIG. 3) for controlling the rotating amount of the shift drum 47A. A change pedal (not shown) for the driver to perform a gear shift operation therewith is attached to an end portion (an end portion on the left side of the vehicle body) of the shift spindle 47E. Attendant on a gear shift operation on the change pedal, the shift spindle 47E is turned, to turn the shift drum 47A through the ratchet mechanism 47D.

The shift drum 47A is disposed between and on the upper side of the main shaft 41 and the counter shaft 42 so that its axis O4 is located on the rear side relative to the axis O3 of the output shaft 43. On the front and rear sides of the shift drum 47, fork shafts 47B and 47C are disposed in parallel to the shift drum 47A. The fork shaft 47B is disposed on the front side of the shift drum 47A so that its axis O5 is located slightly below the axis O4 of the shift drum 47A. The fork shaft 47C is disposed on the rear side of the shift drum 47A so that its axis O6 is located at substantially the same height as the axis O4 of the shift drum 47A.

A shift fork 47B1 engaged with the shifter on the main shaft 41 is supported on the fork shaft 47B, and a shift fork 47C1 engaged with the shifter on the counter shaft 42 is supported on the fork shaft 47C. The speed change gear pair is changed (gear shift is made) by moving the shift forks 47B1 and 47C1 of the gear shaft mechanism 47. The rotation of the main shaft 41 is transmitted to the counter shaft 42 through the speed change gear pair after the gear shift. As shown in FIG. 3, the counter shaft 42 is provided with an intermediate drive gear 42A for transmitting the rotation of the counter shaft 42 to the output shaft 43.

The output shaft 43 is supported by bearings 43C provided at both ends of the counter shaft 42, and is provided with a driven gear 43A which is engaged with the intermediate drive gear 42A. On the output shaft 43, a cam-type torque damper 51 is disposed adjacently to the driven gear 43A. The cam-type torque damper 51 damps a torque change upon generation of the torque change, and has a cylindrical member 52 which is spline-connected to the output shaft 43 so as to be movable in the axial direction. The cylindrical member 52 is provided, at its end face on the side of the driven gear 43A, with a projected cam 52A engaged with a recessed cam 43B formed in the driven gear 43A. A spring holder member 53 is fixed to a substantially central portion of the output shaft 43, a coil spring 54 is provided between the cylindrical member 52 and the spring holder member 53. The cylindrical member 52 is supported by the driven gear 43A. The cam-type torque damper 51 is composed of the cylindrical member 52, the spring holder member 53 and the coil spring 54.

The output shaft 43 is integrally provided with a drive bevel gear 48 at a left end portion thereof. The drive bevel gear 48 is meshed with a driven bevel gear 49A provided integrally at the front end of a drive shaft 49, which extends in the front-rear direction of the vehicle body. This configuration ensures that the rotation of the output shaft 43 is transmitted to the drive shaft 49.

Now, the internal layout of the internal combustion engine 1 will be described referring to FIG. 2.

In this internal combustion engine 1, the main shaft 41 is disposed on the rear side of the crankshaft 2, and the counter shaft 42 is disposed on the rear side of the main shaft 41. Therefore, the crankshaft 2, the main shaft 41 and the counter shaft 42 are arranged in this order from the front side toward the rear side. Accordingly, the vertical length of the crankcase 3 can be suppressed to a small value. In this configuration, even if the main shaft-side driven gear 41A fixed to the main shaft 41 is large in diameter, the main shaft-side driven gear 41A does not protrude upward, as compared with the case where a main shaft is disposed on the upper side of a crankshaft and a counter shaft. This ensures that the crankcase 3 can be restrained from protruding to the upper side. Accordingly, accessories can be arranged between the rear bank Br and an upper surface 3b of the crankcase 3.

Further, the main shaft 41 and the counter shaft 42 are disposed on the mating surface 3S between the upper and lower crankcases 3U and 3L. Therefore, the bearings 41C and 42C for the main shaft 41 and the counter shaft 42 are simplified in structure. Accordingly, assembly of the main shaft 41 and the counter shaft 42 is facilitated.

Since the output shaft 43 is disposed on the front side of the counter shaft 42, the length of the crankcase 3 in the front-rear direction can be suppressed to a small value, as compared with the case where the output shaft 43 is disposed on the rear side of the counter shaft 42. The output shaft 43 is disposed on the lower side of the counter shaft 42, and the output shaft 43 as well as the main shaft 41 and the counter shaft 42 is disposed at one of vertexes of a triangle. Thus, the output shaft 43 is arranged by effectively utilizing a space between the main shaft 41 and the counter shaft 42. Therefore, it is possible to restrain the downward protrusion of the crankcase 3 due to the arrangement of the output shaft 43 on the front side of the counter shaft 42. Accordingly, while suppressing the front-rear length of the crankcase 3 to a small value, the vertical length of the crankcase 3 can also be suppressed to a small value. Consequently, the internal combustion engine 1 can be reduced in size and weight.

Since the front-rear length of the crankcase 3 is thus suppressed to a small value, the wheel base is made shorter. Therefore, it is possible to make the motorcycle 100 (see FIG. 1) compact and to enhance the turning performance of the motorcycle 100.

Since the shift drum 47A is disposed between and on the upper side of the main shaft 41 and the counter shaft 42, the length of the crankcase 3 in the front-rear direction can be suppressed to a small value, as compared with the case where the shift drum 47A is disposed on the rear side of the counter shaft 42. Since the shift drum 47A as well as the main shaft 41 and the counter shaft 42 is disposed at one of the vertexes of a triangle and the shift drum 47A is arranged by effectively utilizing the space between the main shaft 41 and the counter shaft 42, it is possible to restrain the upward protrusion of the crankcase 3 due to the arrangement of the shift drum 47A on the upper side of the main shaft 41 and the counter shaft 42, and it is possible to make the vertical length of the crankcase 3 smaller. Therefore, accessories can be arranged between the rear bank Br and the upper surface 3b of the crankcase 3. In addition, since the distances from the shift drum 47A to the main shaft 41 and the counter shaft 42 can be made shorter, the shift forks 47B1 and 47C1 supported on the fork shafts 47B and 47C can be made shorter, which permits the internal combustion engine 1 to be reduced in size and weight.

Since the shift drum 47A is so disposed that its axis O4 is located on the rear side of the axis O3 of the output shaft 43, the vertical length of the crankshaft 3 can be suppressed to a small value, as compared with the case where the axis of the shift drum and the axis of the output shaft are aligned in the vertical direction. Consequently, accessories can be arranged between the rear bank Br and the upper surface 3b of the crankcase 3.

In addition, since the fork shaft 47B as well as the main shaft 41 and the shift drum 47A is disposed at one of the vertexes of a triangle and the fork shaft 47B is arranged by effectively utilizing the space between the main shaft 41 and the shift drum 47A, it is possible to restrain the upward protrusion of the crankcase 3 due to the arrangement of the fork shaft 47B on the upper side of the main shaft 41, and to suppress the vertical length of the crankcase 3 to a small value. This permits accessories to be arranged between the rear bank Br and the upper surface 3b of the crankcase 3. Besides, since the distances from the fork shaft 47B to the main shaft 41 and the shift drum 47A can be made shorter, the shift fork 47B1 supported on the fork shaft 47B can be made shorter, which permits the internal combustion engine 1 to be reduced in size and weight.

Similarly, since the fork shaft 47C as well as the counter shaft 42 and the shift drum 47A are disposed at one of the vertexes of a triangle and the fork shaft 47C is arranged by effectively utilizing the space between the counter shaft 42 and the shift drum 47A, it is possible to restrain the upward protrusion of the crankcase 3 due to the arrangement of the fork shaft 47C on the upper side of the counter shaft 42, and to suppress the vertical length of the crankcase 3 to a small value. This makes it possible to arrange accessories between the rear bank Br and the upper surface 3b of the crankcase 3. Besides, since the distances from the fork shaft 47C to the counter shaft 42 and the shift drum 47A can be made shorter, the shift fork 47C1 supported on the fork shaft 47C can be made shorter, which permits the internal combustion engine 1 to be reduced in size and weight.

Hereafter, the clutch mechanism 44 will be described.

Figure 4:
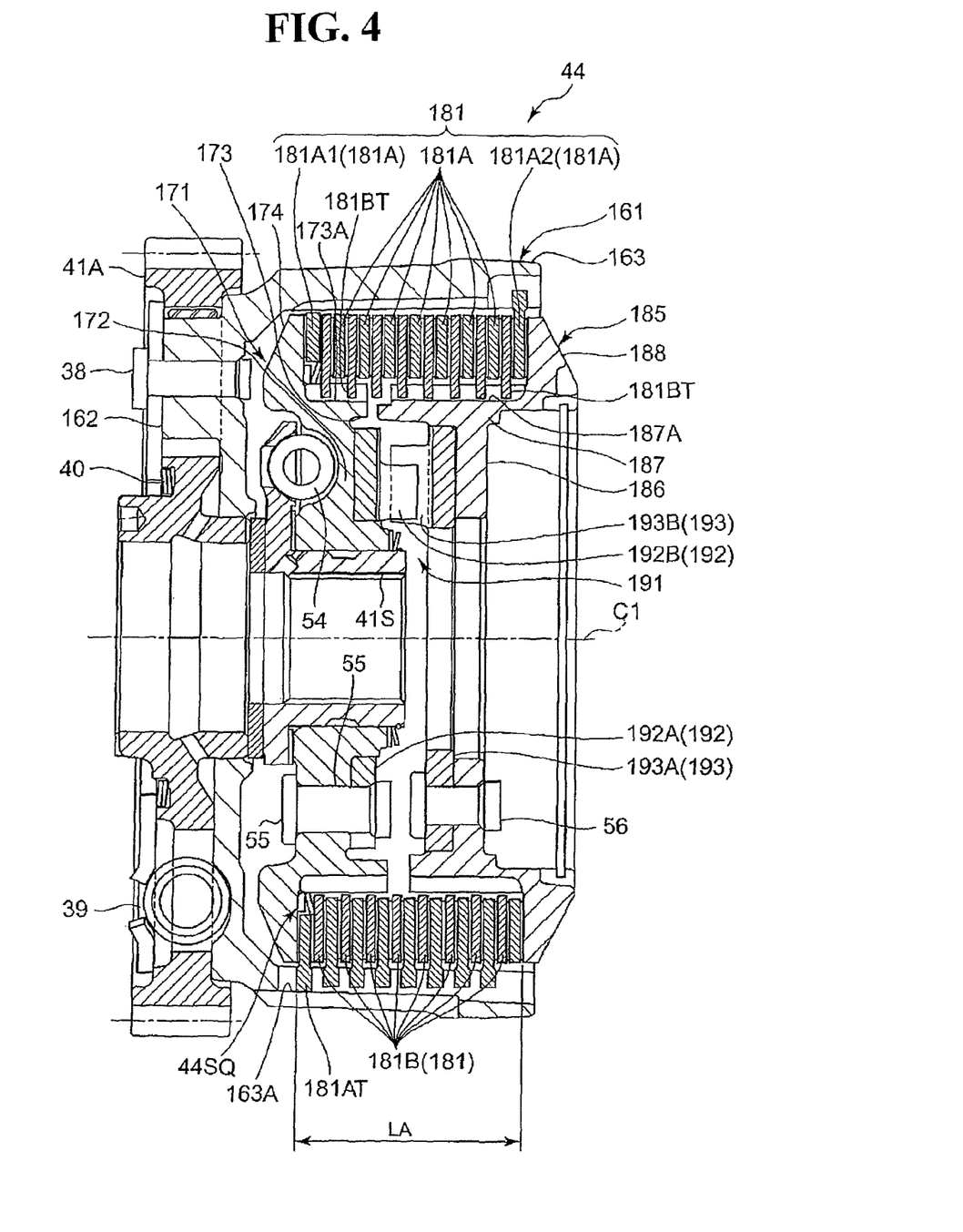
FIG. 4 is a sectional side view showing a clutch mechanism together with the surrounding configuration.

FIG. 4 is a sectional side view showing the clutch mechanism 44 together with the surrounding configuration.

The clutch mechanism 44 is a mechanism which is interposed between the crankshaft 2 serving as an input shaft for input to the clutch mechanism 44 and the main shaft (the output shaft of the clutch mechanism 44) 41 of the transmission 46 and by which the transmission of power between the crankshaft 2 and the main shaft 41 is effected and interrupted.

The clutch mechanism 44 is configured as a multiple disc clutch including: a clutch outer 161 to which a rotating force of the crankshaft 2 is transmitted; a clutch center (also called a clutch hub) 171 provided on the inside of the clutch outer 161 and rotated as one body with the main shaft 41; a plurality of clutch discs 181 held respectively on the clutch outer 161 and the clutch center 171 so as to be rotated integrally with the clutch outer 161 and the clutch center 171; and a pressure plate 185 for pressing or releasing each of the clutch discs 181. Incidentally, symbol C1 in FIG. 4 identifies an axis of rotation of the clutch mechanism 44 (an axis of rotation of the main shaft 41).

The clutch discs 181 include a plurality of clutch discs 181A provided as first clutch discs attached to the clutch outer 161, and a plurality of clutch plates 181B provided as second clutch discs which are divisionally attached to the clutch center 171 (functioning as a clutch inner) and the pressure plate 185.

The clutch discs 181A and the clutch plates 181B are arranged alternately stacked in the clutch axis direction (the direction of the main shaft 41). The clutch disc 181A has frictional materials adhered to both sides of a single base plate, and the clutch plate 181B is composed of a single metallic plate.

The clutch outer 161 includes a circular disc-shaped base part 162 connected to the main shaft-side driven gear 41A which is inserted in the main shaft 41 and receives a rotating force from the crankshaft 2, and an extension cylindrical part 163 which is provided at an outer circumferential portion of the base part 162 coaxially with the base part 162 and extends in a tubular form along the axis C1 in the periphery of the main shaft 41. The clutch outer 161 is provided coaxially with the main shaft 41.

The base part 162 is connected to the main shaft-side driven gear 41A through a pin 38 and a damper 39. The damper 39 damps an abrupt rise in a force transmitted between the main shaft-side driven gear 41A and the clutch outer 161. Incidentally, symbol 40 in FIG. 4 identifies a coned disc spring for biasing the clutch outer 161 against the main shaft-side driven gear 41A in the axial direction.

The extension cylindrical part 163 is provided on the inside thereof with a multiplicity of lock grooves 163A extending along the axis C1, at intervals along the circumferential direction. A multiplicity of lock claws 181AT projected on the outer circumferences of a plurality of clutch discs 181A are engaged in the lock grooves 163A, whereby the clutch discs 181A are so engaged that they can be moved in the axial direction of the main shaft 41 and be rotated integrally with the main shaft 41.

Since the clutch outer 161 is connected to the main shaft-side driven gear 41A, it is rotated integrally with the crankshaft 2 through the main shaft-side driven gear 41A, and the clutch discs 181A are also rotated together with the crankshaft 2.

The clutch center 171 includes a circular disc-shaped base part 172 insertion-fitted to the main shaft 41 and connected to the main shaft 41, a cylindrical part 173 provided at an outer circumferential portion of the base part 172 coaxially with the base part 172 and extending in a tubular form along the axis C1 on the inner circumference side of the clutch outer 161, and a pressure flange part 174 enlarged in diameter from one end side (the main shaft-side driven gear 471A side) of the cylindrical part 173. The clutch center 171 is provided on the inside of the clutch outer 161 coaxially with the main shaft 41.

The base part 172 is connected through a damper 54 to a flanged sleeve 41S spline-connected to the main shaft 41. An abrupt rise in power transmitted between the clutch center 171 and the main shaft 41 is damped by the damper 54.

The cylindrical part 173 is oppositely disposed on the inner circumference side of the extension cylindrical part 163 of the clutch outer 161, leaving a predetermined gap therebetween. The cylindrical part 173 is provided in its outer circumferential surface with a multiplicity of lock grooves 173A along the axis C1. A multiplicity of lock claws 181BT projected on the inner circumferential surfaces of a plurality of clutch plates 181B are engaged in the lock grooves 173A so as to permit movement in the clutch axis direction, whereby the clutch plates 181B are engaged with the clutch center 171 so that they can be moved in the axial direction of the clutch center 171 and be rotated integrally with the clutch center 171.

Since the clutch center 171 is spline-connected to the main shaft 41, the clutch center 171 is rotated as one body with the main shaft 41, and the clutch plates 181B (the three clutch plates 181B on the left side in FIG. 4) attached to the clutch center 171 are also rotated together with the main shaft 41.

The pressure plate 185 includes a circular disc-shaped base part 186 disposed oppositely to the base part 172 of the clutch outer 161, a cylindrical part 187 which is provided at an outer circumferential portion of the base part 186 coaxially with the base part 186 and which extends toward the cylindrical part 173 of the clutch center 171 while being equal in diameter to the cylindrical part 173, and a pressure flange part 188 enlarged in diameter from one end side (the side opposite to the main shaft-side driven gear 471A) of the cylindrical part 187. The pressure plate 185 is provided coaxially with the main shaft 41.

The cylindrical part 187 is formed to be equal in outside diameter to the cylindrical part 173 of the clutch center 171, and is oppositely disposed on the inner circumference side of the extension cylindrical part 163 of the clutch outer 161, leaving a predetermined gap therebetween. The cylindrical part 187 is provided in its outer circumferential surface with a multiplicity of lock grooves 187A along the axis C1. A multiplicity of lock claws 181BT projected on the inner circumferential surfaces of the clutch plates 181B (the five clutch plates 181B on the right side, other than the clutch plates 181B supported on the clutch center 171) are engaged in the lock grooves 187A so as to permit movement in the clutch axis direction. Therefore, the clutch plates 181B supported by the pressure plate 185 are rotated together with the pressure plate 185.

In assembling the clutch mechanism 44, the main shaft-side driven gear 41A and the clutch outer 161 are sequentially assembled onto the main shaft 41, then a sleeve 41S and the clutch center 171 are sequentially assembled, and the clutch discs 181A and the clutch plates 181B in an alternately stacked state are disposed between the clutch center 171 and the pressure plate 185. The pressure plate 185 is biased by a biasing member 44SP shown in FIG. 3 in such a direction as to press the clutch discs 181A and the clutch plates 181B against each other, and the clutch discs 181A and the clutch plates 181B are pressed against each other by the biasing force, whereby the clutch mechanism 44 is maintained in an engaged state.

Incidentally, the internal combustion engine 1 is provided with a clutch oil hydraulic mechanism (see FIG. 3) for operating the clutch mechanism 44 by an oil pressure. The clutch oil hydraulic mechanism is a mechanism for switching over the engaged/disengaged state of the clutch mechanism 44; in this embodiment, the clutch mechanism 44 is switched over into the non-engaged state (disengaged state) when the clutch oil hydraulic mechanism is operated.

As shown in FIG. 3, the clutch oil hydraulic mechanism includes a push rod inserted in the main shaft 41 (which is formed in a hollow cylindrical shape) so as to be movable in the axial direction, a hydraulic cylinder for pushing the push rod, and an oil pressure source (not shown) for supplying the hydraulic cylinder with an oil pressure (clutch operating oil pressure). By the clutch hydraulic mechanism, the push rod is moved toward the clutch mechanism 44 side against the spring biasing force exerted by the biasing member 44SP of the clutch mechanism 44, and a lifter piece in the clutch mechanism 44 is moved to switch over the clutch mechanism 44 into the non-engaged state. In this manner, the clutch mechanism 44 is engaged and disengaged.

In addition, the clutch mechanism 44 is provided with a cam mechanism 191 between the clutch center 171 and the pressure plate 185. The cam mechanism 191 functions as a slipper cam for moving the pressure plate 185 in the clutch axis direction so as to augment or lessen the pressure exerted on the clutch plate 181 by the pressure plate 185 when a relative rotational difference is generated between the clutch center 171 and the pressure plate 185.

The cam mechanism 191 includes a center-side cam 192 which is a projected cam member provided on the clutch center 171, and a plate-side cam 193 which is a recessed cam member provided in the pressure plate 185.

Figure 5:
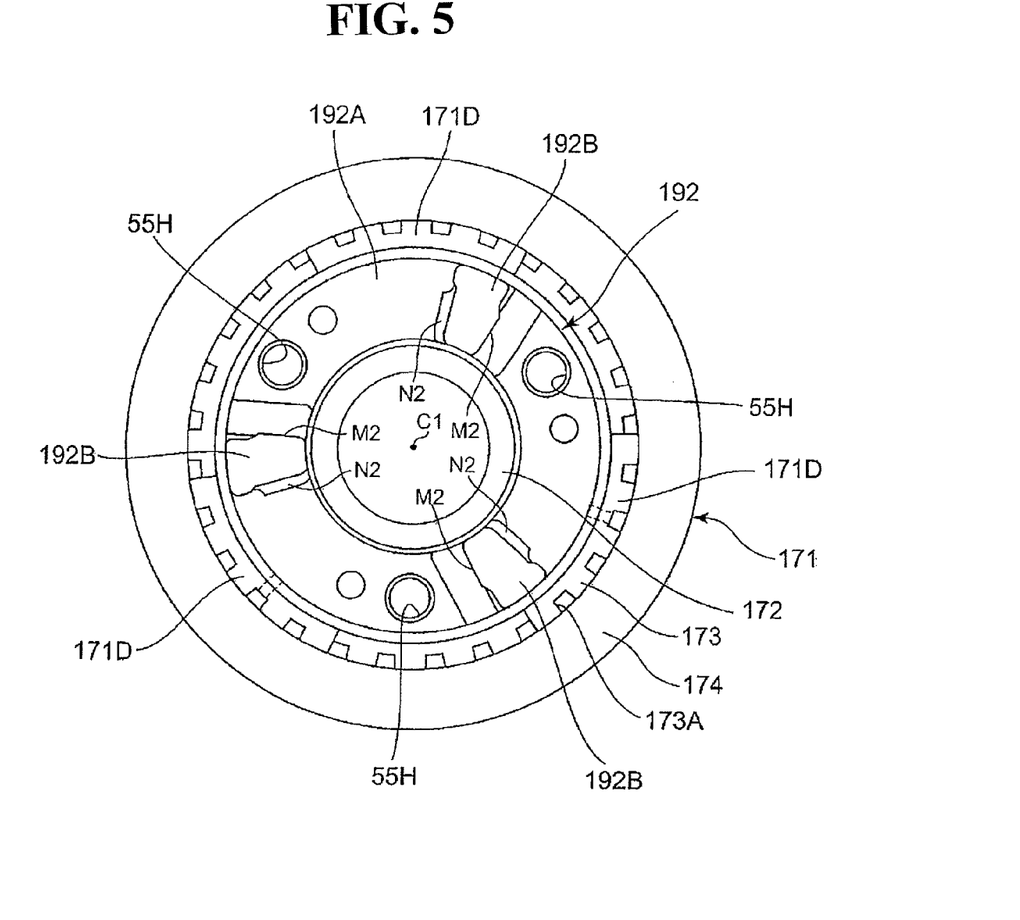
FIG. 5 is a plan view showing a clutch center together with a center-side cam.
Figure 6:
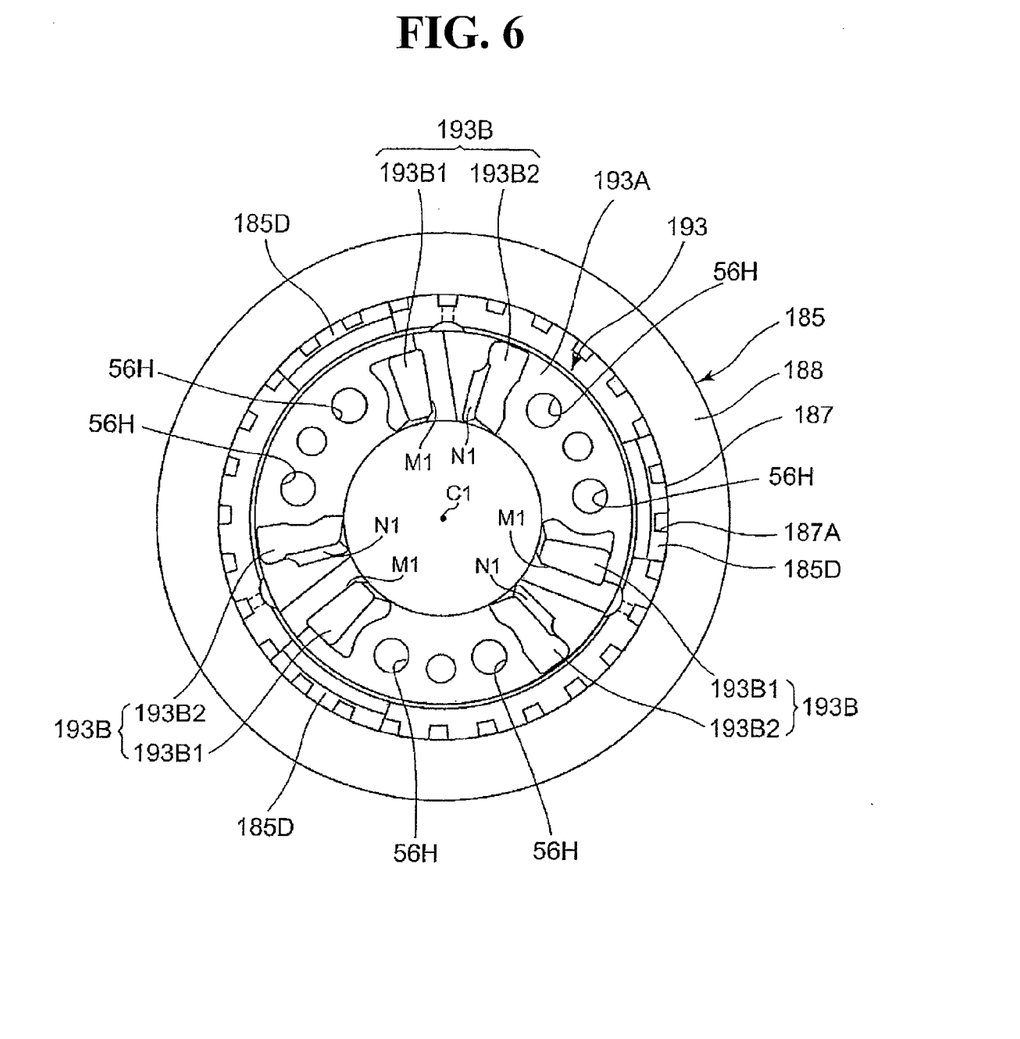
FIG. 6 is a plan view showing a pressure plate together with a plate-side cam.

FIG. 5 is a plan view showing the clutch center 171 together with the center-side cam 192, and FIG. 6 is a plan view showing the pressure plate 185 together with the plate-side cam 193.

As shown in FIGS. 4 and 5, the center-side cam 192 includes a circular disc-shaped cam body part 192A attached through pins 55 (see FIG. 4) to that surface of the clutch center 171 which is located on the side of the pressure plate 185, so as to be rotatable together with the clutch center 171, and projected cams 192B provided integrally on the cam body part 192A. The projected cams 192B are projected toward the side of the pressure plate 185, and are provided in plurality at intervals along the circumferential direction (in this example, three projected cams are provided at intervals of 120 degrees), as shown in FIG. 5. Incidentally, symbol 55H in FIG. 5 identifies a hole for passing the above-mentioned pin 55 for attaching the center-side cam 192.

As shown in FIGS. 4 and 6, the plate-side cam 193 includes a circular disc-shaped cam body part 193A attached through pins 56 (see FIG. 4) to that surface of the pressure plate 185 which is located on the side of the clutch center 171, so as to be rotatable together with the pressure plate 185, and recessed cams 193B integrally provided in the cam body part 193A and meshed respectively with the above-mentioned projected cams 192B. The recessed cams 193B are provided in plurality at intervals along the circumferential direction (in this example, three recessed cams are provided at intervals of 120 degrees). As shown in FIG. 6, each of the recessed cams 193B includes a pair of an upstream-side cam 193B1 and a downstream-side cam 193B2 which are adjacent to each other along the clutch rotating direction (circumferential direction), and the corresponding projected cam 192B is located between the pair of upstream-side cam 193B1 and downstream-side cam 193B2. Incidentally, symbol 56H in FIG. 6 identifies a hole for passing the above-mentioned pin 56 for attaching the plate-side cam 193.

Figure 7A:
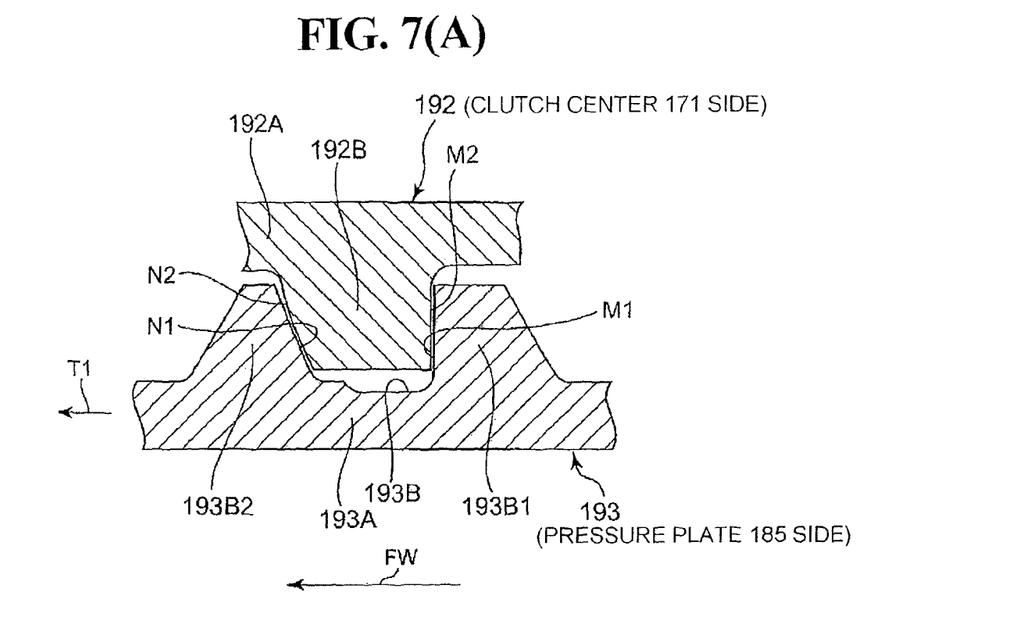
FIG. 7(A) is a view showing a projected cam and a recessed cam at the time when a back torque is not acting, in section along a clutch rotating direction.
Figure 7B:
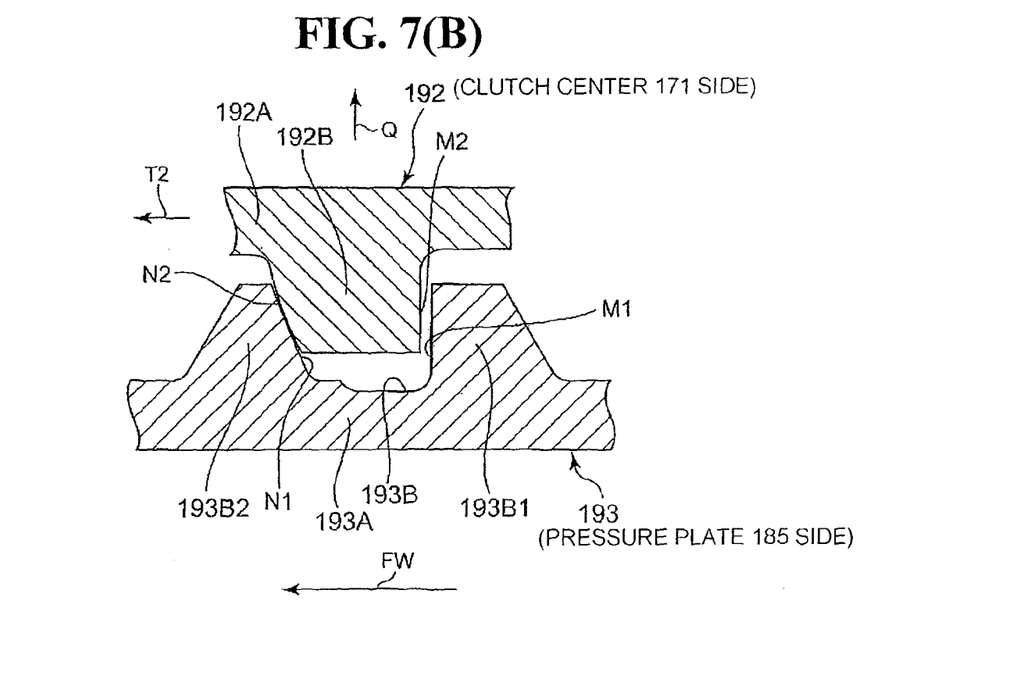
FIG. 7(B) is a view showing the projected cam and the recessed cam at the time when the back torque is acting, in section along the clutch rotating direction.

FIGS. 7(A) and 7(B) illustrate the projected cam 192B and the recessed cam 193B, in section along the clutch rotating direction. Incidentally, symbol FW in the figures indicates the normal-rotation direction of the clutch.

In the case where a drive torque is acting from the internal combustion engine 1 side and where a torque (so-called back torque) in the direction reverse to the drive direction is not acting from the drive wheel side (the rear wheel 131 side) (in the case of normal rotation), as shown in FIG. 7(A), the upstream-side cam 193B1 of the pressure plate 185 is abutted on the projected cam 192B of the clutch center 171 by a relative rotation difference (a relative rotational torque (normal rotation torque) indicated by arrow T1 in the figure) between the pressure plate 185 and the clutch center 171.

Contact surfaces (normal rotation time abutting surfaces) M1 and M2 of the upstream-side cam 193B1 and the projected cam 192B in this case are formed respectively as cam surfaces (perpendicular cam surfaces) which are substantially perpendicular to the clutch rotating direction, as shown in FIG. 7(B). By these cams, therefore, a torque in the normal direction is transmitted from the pressure plate 185 side to the clutch center 171 side, without moving the pressure plate 185 in the clutch axis direction.

On the other hand, in the case where a back torque is exerted from the drive wheel side (the rear wheel 131 side) due to an engine brake or the like, the back torque causes a relative rotational difference (a relative rotational torque indicated by arrow T2 in FIG. 7) to act between the pressure plate 185 and the clutch center 171. Consequently, as shown in FIG. 7(B), the upstream-side cam 193B1 of the pressure plate 185 and the projected cam 192B of the clutch center 171 are separated from each other, and the projected cam 192B of the clutch center 171 is abutted on the downstream-side cam 193B2 of the pressure plate 185.

Contact surfaces (back torque time abutting surfaces) N1 and N2 of the downstream-side cam 193B2 and the projected cam 192B in this case are respectively at slant cam surfaces for moving the pressure plate 185 in the clutch axis direction toward the side away from the clutch center 171 (in the orientation indicated by arrow Q in FIG. 7) by the abutting force. More specifically, the contact surface N1 of the downstream-side cam 193B2 is formed as a slant surface which is rectilinearly slanted toward the downstream side as one goes toward the projected tip side, while the abutting surface N2 of the projected cam 192B is formed as an arcuate slant cam surface which is inclined toward the upstream side as one goes toward the projected tip side.

Therefore, in the case where the back torque is acting, the projected cam 192B of the clutch center 171 slides in the circumferential direction relative to the downstream-side cam 193B2 of the pressure plate 185, and the pressure plate 185 is separated from the clutch center 171 in the clutch axis direction (moved in the direction of arrow C in FIG. 7) along the respective inclinations, whereby the pressure exerted on the clutch discs 181 by the pressure plate 185 is lessened. Consequently, clutch capacity is lowered, and the back torque is released.

Incidentally, a configuration may be adopted in which the contact surfaces (normal rotation time abutting surfaces) M1 and M2 of the upstream-side cam 193B1 and the projected cam 192B are formed as slant cam surfaces for moving the pressure plate 185 in the clutch axis direction toward the side for approaching the clutch center 171 (in the direction opposite to arrow C in FIG. 7) by the abutting force, instead of being formed as cam surfaces perpendicular to the clutch rotating direction, and in which the pressure exerted on the clutch plate 181 by the pressure plate 185 is augmented by the relative rotational torque indicated by arrow T1 when a normal rotation torque is transmitted.

Figure 8:
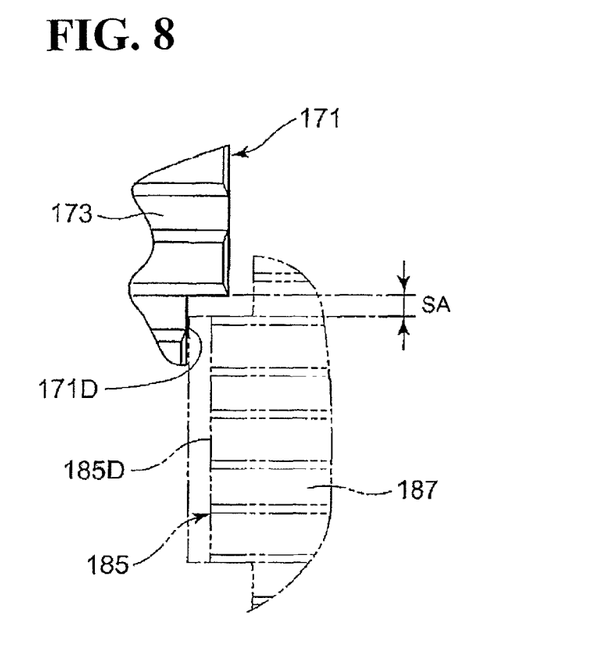
FIG. 8 illustrates a center-side stepped part of the clutch center and a plate-side stepped part of the pressure plate.

In addition, as shown in FIG. 8, the clutch center 171 is provided with center-side stepped parts 171D recessed to the side opposite to the pressure plate 185 in side view, at a plurality of locations (in this example, at three locations) at intervals along the circumferential direction. Besides, the pressure plate 185 is provided with plate-side stepped parts 185D projected toward the clutch center 171 side in side view, at a plurality of locations (in this example, at three locations) at intervals along the circumferential direction.

The plate-side stepped part 185D enters the center-side stepped part 171D, leaving therebetween a gap SA in the circumferential direction, so as to permit relative rotation of the clutch center 171 and the pressure plate 185 and to facilitate positioning, such as positioning the projected cam 192B of the clutch center 171 inside the recessed cam 193 of the pressure plate 185.

Meanwhile, since the clutch mechanism 44 is a multiple disc clutch, accumulation of individual dimensional errors of the multiplicity of clutch discs 181 results in an undesirable shift of the engagement/disengagement timing of the clutch. Further, since in this clutch mechanism 44 the pressure (pressing force) associated with the engagement/disengagement of the clutch is varied by the cam mechanism 191 provided inside the clutch, the clutch pressing force when a back torque is transmitted must be set within an appropriate range, and it is particularly important to control the engagement/disengagement timing to a fixed value.

In view of this, in this embodiment, before assembling the clutch discs 181 into the clutch mechanism 44 having the cam mechanism 191, the thickness of the clutch discs 181 is so adjusted that the total thickness LA of a required number of clutch discs 181 in an all combined state will be equal to a target size L0.

Figure 9:
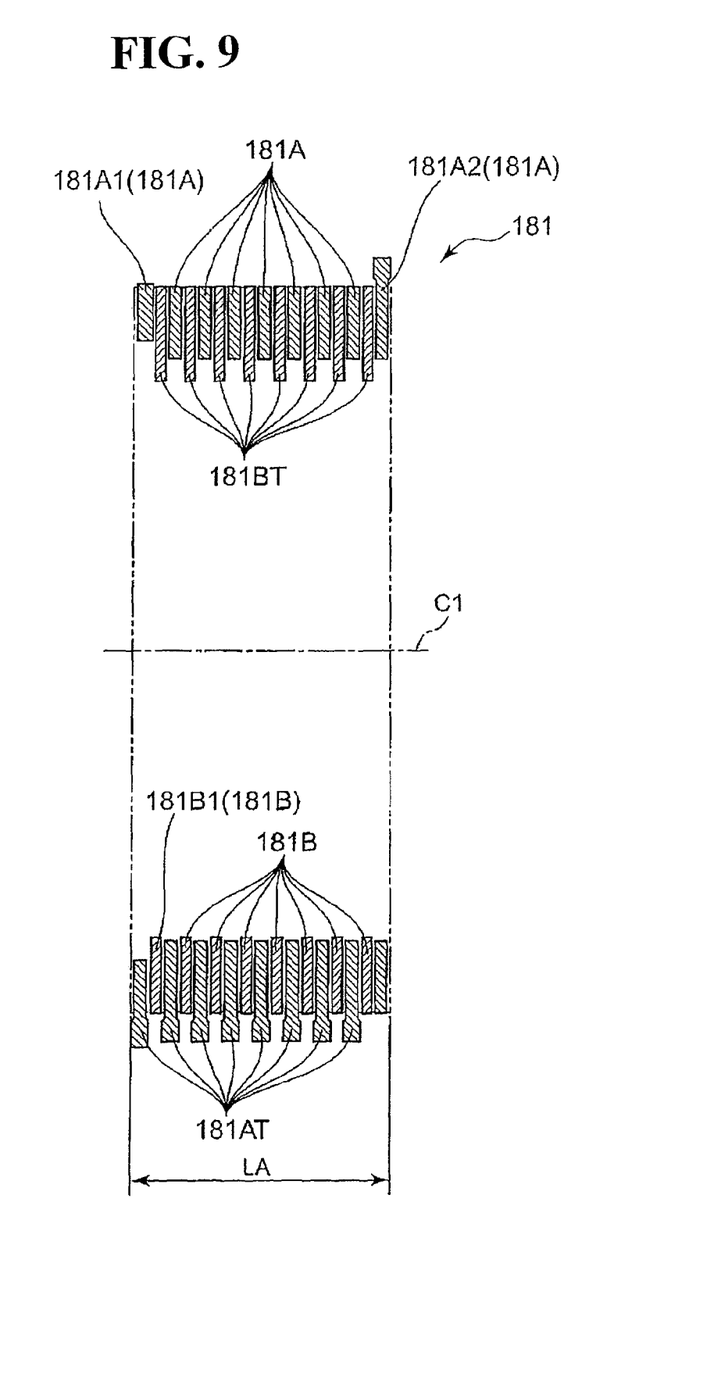
FIG. 9 illustrates the clutch discs before assembled.

FIG. 9 illustrates the clutch discs 181 before assembly.

As has been described above, the clutch discs 181 are classified into two kinds, namely, the plurality of clutch discs 181A attached to the clutch outer 161, and the plurality of clutch plates 181B divisionally attached in pluralities to the clutch center 171 and to the pressure plate 185.

Since the clutch discs 181A are more complicated than the clutch plates 181B in structure, of the two kinds of clutch discs 181A and 181B, specified ones, for example, ones produced to be within preset dimensional ranges (within preset dimensional errors) are used. On the other hand, as for the clutch plates 181B each configured simply by use of a single metallic plate, the thickness is regulated so that the total thickness LA of the clutch discs 181 in an all combined state is adjusted to a predetermined target size L0 by only the regulation of the thickness of the clutch plates 181B.

The target size L0 is set as the thickness LA when a preset load (hereinafter referred to the set load W0) is exerted in the clutch axis direction on the clutch discs 181 in the condition where all the clutch discs 181 are combined. The set load W0 in that case is made to be equal to or approximate to the load exerted on the clutch discs 181 by the biasing member 44SP (see FIG. 3) of the clutch mechanism 44 when the clutch discs 181 are assembled into the clutch mechanism 44.

In performing the work for adjustment to the target size L0, first, a required number of the clutch discs 181A and a required number of the clutch plates 181B formed in the same thickness or substantially the same thickness are tentatively assembled (tentative assembly stage) by alternately stacking them in the same manner as in assembling them into an actual clutch mechanism 44. Next, the clutch discs 181A and the clutch plates 181B are pressed against each other (pressing stage) by exerting the set load W0 thereon, and the total thickness LA of the clutch discs 181A and the clutch plates 181B in this pressed state is measured (measuring stage).

Subsequently, the difference between the measured thickness LA and the target size L0 is obtained, and one or more of the clutch plates 181B are adjusted to one or more clutch plates 181B of different thickness in such a manner as to eliminate (or reduce substantially to zero) the difference (adjusting stage). As a result, the clutch plates 181B are composed of two or more kinds of clutch plates 181B different at least in thickness, for example, clutch plates of 2.0 mm in thickness and clutch plates of 2.3 mm in thickness or the like.

As the method for adjusting the thickness of the clutch plates 181B in this case, there is adopted a method in which one or more of the clutch plates 181B are replaced by one or more clutch plates 181B of different thickness. Incidentally, there may also be adopted a method in which the thickness of one or more of the clutch plates 181B is changed by a grinding or the like technique.

In this manner, the total thickness LA is adjusted to the target size L0 by combining the clutch discs 181 which are different in thickness. In the case where the total thickness LA cannot be adjusted to the target size L0 by one run of adjustment, it suffices to repeat the adjustment of thickness of the clutch plates 181B. In this embodiment, only the thickness of the clutch plates 181B which are each a single metallic plate is adjusted. Therefore, the clutch discs 181A more complicated than the clutch plates 181B in configuration need not be prepared in a plurality of kinds of thicknesses. This promises a reduction in cost through a reduction in the number of component parts or the like.

After the adjustment to the target size L0 is thus conducted, the clutch discs 181 are assembled to constitute the clutch mechanism 44, whereby the clutch engagement/disengagement timing can be controlled to a fixed value.

In this embodiment, as for the clutch discs 181A, of the clutch discs 181A and the clutch plates 181B, the thickness of a pair of the clutch discs 181A1 and 181A2 located at the outermost end portions is set to be different from the thickness of the adjacent clutch disc (the thickness of the other clutch discs 181A than the clutch discs 181A1, 181A2, or the thickness of the clutch plates 181B).

The thickness of the pair of clutch discs 181A1 and 181A2 located at the outermost end portions is set according to the total thickness of the clutch discs 181 to be attained. Specifically, at the time of adjusting the total thickness of the clutch discs 181 to a larger thickness, the thickness of the pair of clutch discs 181A1 and 181A2 is increased; on the other hand, at the time of adjusting the total thickness of the clutch discs 181 to a smaller thickness, the thickness of the pair of clutch discs 181A1 and 181A2 is decreased. This ensures that the range of adjustment is widened, and the replacing work can be carried out efficiently because the clutch discs at both ends are changed.

Incidentally, symbol 44SQ in FIG. 4 identifies a spring member for avoiding vibration (so-called judder) generated at the time of clutch engagement. The spring member 44SQ is disposed between the clutch center 171 and the clutch plate 181B located closest to the clutch center 171, so that the spring member 44SQ makes contact with the clutch plate 181B1 closest to the clutch center 171. In view of this, the clutch plate 181B1 brought into contact with the spring member 44SQ is preliminarily subjected to a heat treatment for enhancing durability, and is different from the other clutch plates 181B in this point. It should be noted that, in adjusting the total thickness LA of the clutch discs 181, it suffices to take all the clutch plates 181B inclusive of the clutch plate 181B1 as targets of thickness adjustment, and to adjust the thickness of arbitrary one or ones of the clutch plates 181B.

As has been described above, according to the configuration in this embodiment, two kinds of clutch discs 181 different at least in thickness are combined, and one or more of the clutch discs 181 are replaced by one or more clutch discs of other thickness so that the total thickness LA of a required number of combined clutch discs 181 when a predetermined set load W0 (pressure) is exerted thereon will be equal to a predetermined size (target size L0), thereby adjusting the total thickness LA of the required number of the combined clutch discs 181 to the predetermined size (target size L0). Therefore, it is possible to reduce the dimensional error of the clutch discs 181 as a whole, and to adjust the clutch engagement/disengagement timing to a fixed value.

Moreover, in this configuration, the adjustment of the total thickness LA of the clutch discs 181 is conducted in the clutch mechanism 44 in which a cam mechanism 191 for varying the pressure exerted on the clutch discs 181 is provided between the clutch center 171 and the pressure plate 185. Therefore, the position where the clutch pressing force is adjusted by the cam mechanism 191 can be made accurate, and the clutch pressing force adjusted by the cam mechanism 191 at the time of transmission of a back torque or the like can be controlled to within an appropriate range.

Besides, in this configuration, as shown in FIGS. 4 and 9, the clutch plates 181B rotated together with the main shaft 41 serving as the output shaft of the clutch mechanism 44 are divisionally attached in pluralities to the clutch center 171 and to the pressure plate 185, and these clutch plates 181B are composed of clutch plates of substantially the same thickness which are integrally assembled onto the clutch center 171 and onto the pressure plate 185. In this case, since the clutch plates 181B are assembled onto each of the clutch center 171 and the pressure plate 185, the assembling work would not be troublesome.

In addition, the clutch center 171 is provided with the center-side stepped parts 171D recessed to the side opposite to the pressure plate 185, whereas the pressure plate 185 is provided with the plate-side stepped parts 185D projected to the side of the clutch center 171, and the center-side stepped parts 171D and the plate-side stepped parts 185D are disposed in a complimenting (or nearly engaging) manner. Therefore, in the area of engagement between the center-side stepped portion 171D and the plate-side stepped part 185D, the clutch plate 181B is mounted so as to range to both the clutch center 171 and the pressure plate 185. In such a case, the clutch plate 181B assembled to range to both the clutch center 171 and the pressure plate 185 may be equal in thickness to the clutch plates 181B on the sub-assembled side (in this configuration, the side of the clutch center 171). The equal thickness ensures that mis-assembly can be obviated, and assembleability is enhanced.

Further, in this configuration, the thickness of the clutch discs 181A1 and 181A2 constituting the outermost end ones of the clutch discs 181 which are set is made to be different from the thickness of the adjacent clutch discs 181 (other clutch discs 181A). Therefore, a further adjustment of the total thickness of the clutch discs 181 can be coped with by a change of the thickness of the outermost end clutch discs 181A1 and 181A2. Consequently, the range of adjustment is widened, and the work of replacing the clutch discs 181 can be carried out efficiently.

Incidentally, while the thickness of the clutch discs 181A1 and 181A2 at both ends has been set different from the thickness of the other clutch discs in this embodiment, only the thickness of either one of the end clutch discs may be set different from the thickness of the other clutch discs.

The above-described embodiment is merely a presentation of one mode for carrying out the present invention, and arbitrary modifications and applications are possible within the scope of the invention. For instance, while the case of adjusting the thickness of the clutch discs 181 on the basis of the stack thickness LA of the clutch discs 181 when the same load as the load applied by the biasing member 44SP (see FIG. 3) of the clutch mechanism 44 is exerted thereon has been described in the embodiment above, this load is not limitative. A method may be adopted in which the stack thickness of the clutch discs 181 when a load sufficient for at least bringing the clutch discs 181 into close contact with one another is exerted thereon is adjusted to a predetermined size.

In addition, while the case of applying the present invention to a multiple disc clutch having the cam mechanism 191 has been described in the embodiment above, the invention is also applicable to a multiple disc clutch not having the cam mechanism 191 and to an assembling method for the multiple disc clutch.

Besides, while the case of applying the present invention to a multiple disc clutch in the motorcycle 100 shown in FIG. 1 and to an assembling method for the multiple disc clutch has been described in the embodiment above, this is not limitative. For instance, the invention is also applicable to a multiple disc clutch for other saddle-type vehicles such as other motorcycles and to an assembling method for the multiple disc clutch. Incidentally, the saddle-type vehicles generally include those vehicles in which the driver rides astride a vehicle body; thus the saddle-type vehicles include not only motorcycles (inclusive of motor bicycles) but also those three-wheel vehicles and four-wheel vehicles which are classified as ATVs (all-terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiple disc clutch comprising:
   a clutch outer to which a rotating force of a crankshaft is transmitted;
   a clutch center provided on an inner side of the clutch outer and rotated integrally with an output shaft;
   a plurality of clutch discs integrally rotatably held respectively on the clutch outer and the clutch center; and
   a pressure plate operable to press or release each of the clutch discs,
   wherein two kinds of clutch discs different at least in thickness are combined, and the total thickness of a required number of the clutch discs in a combined state is adjusted to a predetermined size, and
   wherein, of the clutch discs rotated integrally with the output shaft, a first plurality of the clutch discs and a second plurality of the clutch discs are attached respectively to the clutch center and the pressure plate.

2. The multiple disc clutch according to claim 1, further comprising a cam mechanism which is provided between the clutch center and the pressure plate and which moves the pressure plate in a clutch axis direction so as to augment or lessen a pressure applied from the pressure plate onto the clutch disc when a relative difference in rotation is generated between the clutch center and the pressure plate.

3. The multiple disc clutch according to claim 2, wherein the first plurality of the clutch discs and the second plurality of the clutch discs have substantially the same thickness.

4. The multiple disc clutch according to claim 2, wherein the thickness of the clutch disc at an outermost end portion on either one side of the clutch discs in the multiple disc clutch is set to be different from the thickness of the adjacent clutch disc.

5. The multiple disc clutch according to claim 1, wherein the thickness of the clutch disc at an outermost end portion on either one side of the clutch discs in the multiple disc clutch is set to be different from the thickness of the adjacent clutch disc.

6. The multiple disc clutch according to claim 1, wherein the plurality of clutch discs are arranged in a stack and are alternately supported by the clutch outer and the clutch center.

7. A multiple disc clutch comprising:
   a clutch outer to which a rotating force of a crankshaft is transmitted;
   a clutch center provided on an inner side of the clutch outer and rotated integrally with an output shaft;
   a pressure plate operable to press or release each of the clutch discs; and
   a plurality of clutch discs integrally rotatably held respectively on the clutch outer, the clutch center and the pressure plate, wherein at least two of the plurality of clutch discs have different thicknesses, and a total thickness of the plurality of clutch discs are adjustable to a predetermined size.

8. The multiple disc clutch according to claim 7, further comprising a cam mechanism which is provided between the clutch center and the pressure plate and which moves the pressure plate in a clutch axis direction so as to augment or lessen a pressure applied from the pressure plate onto the clutch disc when a relative difference in rotation is generated between the clutch center and the pressure plate.

9. The multiple disc clutch according to claim 8, wherein the plurality of clutch discs integrally rotatably held on the clutch center and the pressure plate have substantially the same thickness.

10. The multiple disc clutch according to claim 8, wherein the thickness of the clutch disc at an outermost end portion on either one side of the clutch discs in the multiple disc clutch is set to be different from the thickness of the adjacent clutch disc.

11. The multiple disc clutch according to claim 7, wherein the thickness of the clutch disc at an outermost end portion on either one side of the clutch discs in the multiple disc clutch is set to be different from the thickness of the adjacent clutch disc.

12. The multiple disc clutch according to claim 7, wherein the plurality of clutch discs are arranged in a stack and are alternately supported by the clutch outer and the clutch center at a first portion along a length of the plurality of clutch discs, and are alternately supported by the clutch outer and the pressure plate along a second portion of a length thereof.

13. A method of assembling a multiple disc clutch comprising a clutch outer to which a rotating force of a crankshaft is transmitted, a clutch center provided on an inner side of the clutch outer and rotated integrally with an output shaft, a plurality of clutch discs integrally rotatably held respectively on the clutch outer and the clutch center, and a pressure plate operable to press or release each of the clutch discs, said method comprising the steps of:
of the clutch discs rotated integrally with the output shaft, attaching a first plurality of the clutch discs and a second plurality of the clutch discs respectively to the clutch center and the pressure plate;
combining two kinds of clutch discs different at least in thickness;
replacing the clutch disc or discs with clutch disc or discs of other thickness so that the total thickness of a required number of the combined clutch discs when a predetermined pressure is applied thereto will be equal to a predetermined size; and
adjusting the total thickness to the predetermined size.

14. The method of assembling the multiple disc clutch according to claim 13, further comprising the step of providing a cam mechanism between the clutch center and the pressure plate to move the pressure plate in a clutch axis direction so as to augment or lessen a pressure applied from the pressure plate onto the clutch disc when a relative difference in rotation is generated between the clutch center and the pressure plate.

15. The method of assembling the multiple disc clutch according to claim 14, further comprising the steps of:
providing the first plurality of the clutch discs and the second plurality of the clutch discs to have substantially the same thickness.

16. The method of assembling the multiple disc clutch according to claim 14, further comprising the step of setting the thickness of the clutch disc at an outermost end portion on either one side of the clutch discs in the multiple disc clutch to be different from the thickness of the adjacent clutch disc.

17. The method of assembling the multiple disc clutch according to claim 13, further comprising the step of setting the thickness of the clutch disc at an outermost end portion on either one side of the clutch discs in the multiple disc clutch to be different from the thickness of the adjacent clutch disc.

18. A method of assembling a multiple disc clutch comprising a clutch outer to which a rotating force of a crankshaft is transmitted, a clutch center provided on an inner side of the clutch outer and rotated integrally with an output shaft, a plurality of clutch discs integrally rotatably held respectively on the clutch outer and the clutch center, and a pressure plate operable to press or release each of the clutch discs, said method comprising the steps of:
combining two kinds of clutch discs different at least in thickness;
replacing the clutch disc or discs with clutch disc or discs of other thickness so that the total thickness of a required number of the combined clutch discs when a predetermined pressure is applied thereto will be equal to a predetermined size;
adjusting the total thickness to the predetermined size; and
arranging the plurality of clutch discs in a stack and alternately supporting a first plurality of clutch discs by the clutch outer and the clutch center at a first portion along a length of the plurality of clutch discs, and alternately supporting a second plurality of the clutch discs by the clutch outer and the pressure plate along a second portion of a length thereof.

\* \* \* \* \*